US010867596B2

(12) United States Patent
Yoneda et al.

(10) Patent No.: US 10,867,596 B2
(45) Date of Patent: Dec. 15, 2020

(54) VOICE ASSISTANT SYSTEM, SERVER APPARATUS, DEVICE, VOICE ASSISTANT METHOD THEREFOR, AND PROGRAM TO BE EXECUTED BY COMPUTER

(71) Applicant: LENOVO (Singapore) PTE. LTD., New Tech Park (SG)

(72) Inventors: Masaharu Yoneda, Yokohama (JP); Kazuhiro Kosugi, Yokohama (JP); Koji Kawakita, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 173 days.

(21) Appl. No.: 16/100,142

(22) Filed: Aug. 9, 2018

(65) Prior Publication Data

US 2019/0051289 A1    Feb. 14, 2019

(30) Foreign Application Priority Data

Aug. 9, 2017   (JP) .................................. 2017-154571

(51) Int. Cl.
| | |
|---|---|
| *G10L 15/00* | (2013.01) |
| *G10L 15/07* | (2013.01) |
| *G10L 15/08* | (2006.01) |
| *G10L 21/0208* | (2013.01) |
| *G10L 15/18* | (2013.01) |
| *G10L 15/32* | (2013.01) |
| *G06F 3/16* | (2006.01) |
| *G10L 15/22* | (2006.01) |

(Continued)

(52) U.S. Cl.
CPC .............. *G10L 15/07* (2013.01); *G06F 3/167* (2013.01); *G10L 15/083* (2013.01); *G10L 15/18* (2013.01); *G10L 15/32* (2013.01); *G10L 21/0208* (2013.01); *G10L 13/02* (2013.01); *G10L 15/22* (2013.01); *G10L 15/30* (2013.01); *G10L 2015/086* (2013.01); *G10L 2021/02082* (2013.01)

(58) Field of Classification Search
CPC ....................................................... G10L 15/00
USPC ............ 704/231, 500, 235, 233, 234, 232, 9
See application file for complete search history.

(56) References Cited

U.S. PATENT DOCUMENTS

| | | | | |
|---|---|---|---|---|
| 9,972,320 | B2 * | 5/2018 | Melendo Casado | .... G10L 15/22 |
| 10,147,425 | B2 * | 12/2018 | Yang | ........................ G06F 3/167 |
| 10,152,968 | B1 * | 12/2018 | Agrusa | ................... G10L 15/22 |

(Continued)

FOREIGN PATENT DOCUMENTS

| | | | |
|---|---|---|---|
| JP | 05007385 | A | 1/1993 |
| JP | 05249989 | A | 9/1993 |

(Continued)

*Primary Examiner* — Michael Colucci
(74) *Attorney, Agent, or Firm* — Kunzler Bean & Adamson

(57) ABSTRACT

A voice assistant system includes a server apparatus performing voice assistant and a plurality of devices, in which the server apparatus and the devices are communicatively connected to each other. The plurality of devices each records the same user's speech through a microphone, and then transmits recorded data of the same user's speech to the server apparatus. The server apparatus receives the recorded data transmitted from each of the plurality of devices, and then voice-recognizes two or more of the received recorded data in accordance with a predetermined standard to thereby interpret the contents of the user's speech to perform the voice assistant.

20 Claims, 8 Drawing Sheets

(51) Int. Cl.
*G10L 13/02* (2013.01)
*G10L 15/30* (2013.01)

(56) References Cited

U.S. PATENT DOCUMENTS

| | | | | |
|---|---|---|---|---|
| 10,257,363 | B2* | 4/2019 | Mese | H04M 11/007 |
| 2011/0054900 | A1* | 3/2011 | Phillips | G10L 15/30 |
| | | | | 704/235 |
| 2016/0217790 | A1* | 7/2016 | Sharifi | G10L 15/08 |
| 2016/0277588 | A1* | 9/2016 | Jang | H04W 4/60 |
| 2016/0373899 | A1* | 12/2016 | Celinski | H04L 65/60 |
| 2017/0025124 | A1* | 1/2017 | Mixter | G10L 15/32 |
| 2017/0083285 | A1* | 3/2017 | Meyers | G10L 15/00 |
| 2017/0263247 | A1* | 9/2017 | Kang | G10L 15/30 |

FOREIGN PATENT DOCUMENTS

| | | |
|---|---|---|
| JP | 2002258892 A | 9/2002 |
| JP | 2013073240 A | 4/2013 |
| JP | 2014178339 A | 9/2014 |
| JP | 2016114744 A | 6/2016 |
| WO | 2015146179 A1 | 10/2015 |

\* cited by examiner

VOICE ASSISTANT SYSTEM, SERVER APPARATUS, DEVICE, VOICE ASSISTANT METHOD THEREFOR, AND PROGRAM TO BE EXECUTED BY COMPUTER

CROSS-REFERENCE TO RELATED APPLICATIONS

This patent application claims priority to Japan Patent Application No. JP2017-154571, filed on 9 Aug. 2017 for Masaharu Yoneda, et al., the entire contents of which are incorporated herein by reference for all purposes.

FIELD

The present disclosure relates to a voice assistant system, a server apparatus, a device, a voice assistant method, and a program to be executed by a computer.

BACKGROUND

In recent times, voice assistant has been mounted on various kinds of devices. Such a voice assistant is a function of interpreting a user's speech to execute the response to various kinds of questions or operations instructed by voice. The voice assistant generally interprets the contents of speech uttered by a user by utilizing techniques, such as voice recognition or natural language processing.

In general, when a user speaks a predetermined keyword (verbal start command), a voice assistant function is started, which enables the user to use the voice assistant. At present, a unique voice assistant is mounted on each device, and therefore a user needs to properly use a keyword for each device which the user asks, which is inconvenient. For example, the keywords are "Hey Cortana" in the case of Windows (Registered Trademark) machines, "Hey Siri" in the case of iPhone (Registered Trademark) terminals, "OK Google" in the case of Android terminals, and the like.

When two or more of the devices are present in a user's room, the user hesitates in determining which voice assistant of any one of the devices is used in some cases and needs to memorize a keyword for each device, which is inconvenient for the user. In the future, when the internet of things (IoT) becomes more popular, so that various kinds of devices and services cooperate with each other, the number of devices usable for the voice assistant further increases. Therefore, a situation in which a user hesitates in determining which device is needed to recognize a user's voice.

SUMMARY

The present embodiments have been made in view of the above-described circumstances. It is an object of some embodiments of the present invention to provide a voice assistant system, a server apparatus, a device, a voice assistant method, and a program to be executed by a computer which allow a user to easily utilize the voice assistant without hesitation in determining which device usable for the voice assistant is used even when there are two or more of the devices.

In one embodiment, a voice assistant system includes a server apparatus performing voice assistant and a plurality of devices, in which the server apparatus and the devices are communicatively connected to each other. The plurality of devices each records the same user's speech through a microphone, and then transmits recorded data of the same user's speech to the server apparatus. The server apparatus receives the recorded data transmitted from each of the plurality of devices, and then voice-recognizes two or more of the received recorded data in accordance with a predetermined standard to thereby interpret the contents of the user's speech to perform the voice assistant.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
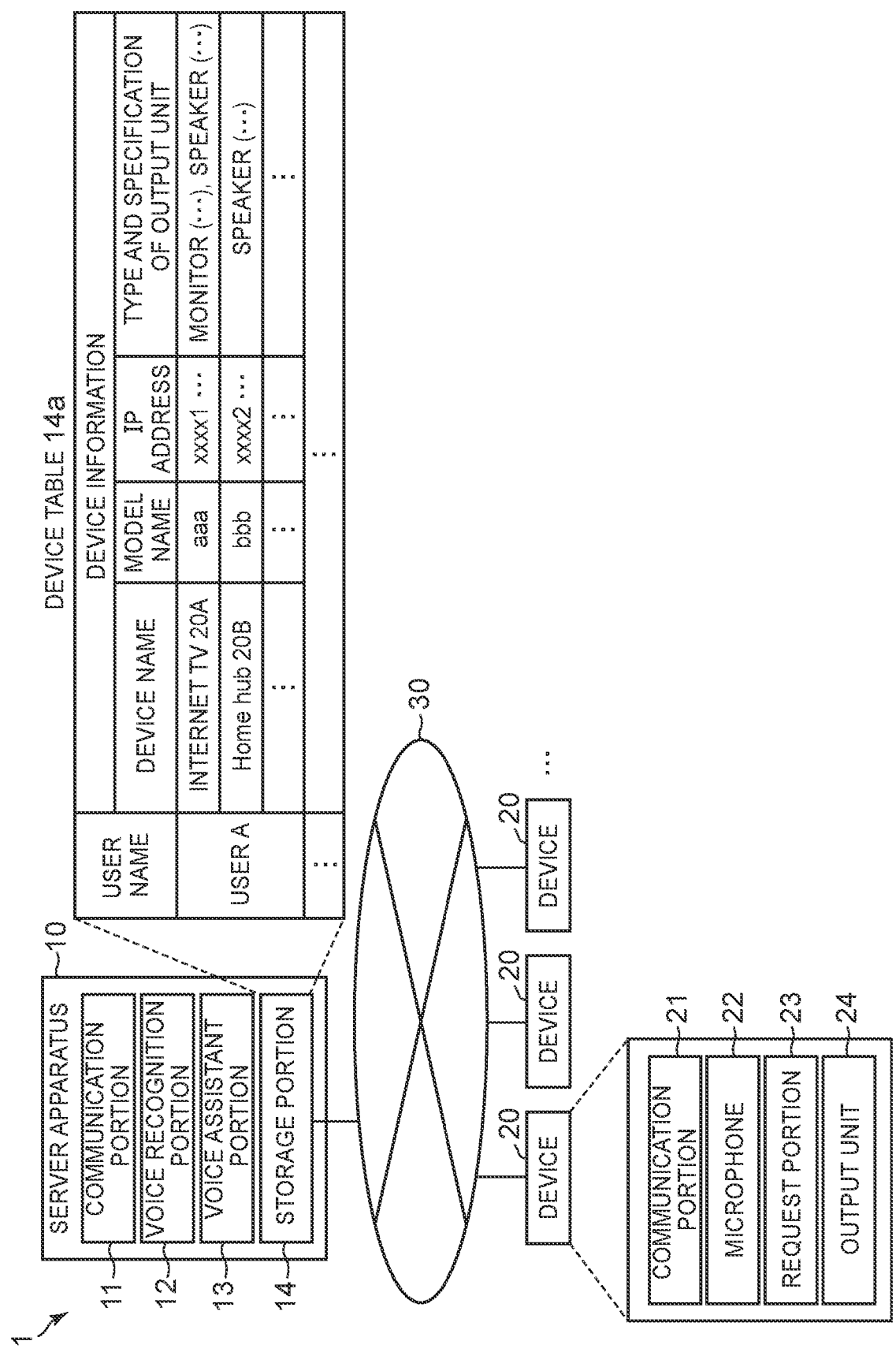
FIG. 1 is a figure illustrating a conceptual diagram of a voice assistant system according to one or more embodiments of the present disclosure.

Hereinafter, embodiments of a computer system to which a voice assistant system, a server apparatus, a device, a voice assistant method, and a program to be executed by a computer according to these embodiments are applied are described. Constituent components of some embodiments of the present invention are generally illustrated in the drawings of this specification but it can be easily understood that the constituent components may be variously disposed and designed with various configurations. Therefore, the following more detailed description about the apparatus, the method, and the program of some embodiments of the present invention does not limit the scope of embodiments of the present invention described in the Claims and merely describes examples of selected embodiments of the present invention and merely describes embodiments selected about the apparatus, the system, and the method without inconsistency with embodiments the present invention described in Claims of this specification. A person skilled in the art can understand that some embodiments of the present invention can be realized with the other methods, components, and materials, even in the absence of one or more of specific details.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," "portion" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules or portions, in order to more particularly emphasize their implementation independence. For example, a module may be implemented as a hardware circuit comprising custom VLSI circuits or gate arrays, off-the-shelf semiconductors such as logic chips, transistors, or other discrete components. A module or portion may also be implemented in programmable hardware devices such as field programmable gate arrays, programmable array logic, programmable logic devices or the like.

Modules or portions may also be implemented in code and/or software for execution by various types of processors. An identified module or portion of code may, for instance, comprise one or more physical or logical blocks of executable code which may, for instance, be organized as an object, procedure, or function. Nevertheless, the executables of an identified module or portion need not be physically located together, but may comprise disparate instructions stored in different locations which, when joined logically together, comprise the module and achieve the stated purpose for the module.

Indeed, a module or portion of code may be a single instruction, or many instructions, and may even be distributed over several different code segments, among different programs, and across several memory devices. Similarly, operational data may be identified and illustrated herein within modules or portions, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

In order to solve the above-described problems to achieve the object, a voice assistant system according to a first aspect of some embodiments of the present invention has a server apparatus performing voice assistant and a plurality of devices, in which the server apparatus and the devices are communicatively connected to each other, the plurality of devices each records the same user's speech through a microphone, and then transmits recorded data of the same user's speech to the server apparatus, and the server apparatus receives the recorded data transmitted from each of the plurality of devices, and then voice-recognizes two or more of the received recorded data in accordance with a predetermined standard to thereby interpret the contents of the user's speech to perform the voice assistant.

The plurality of devices may start the recording of the user's speech after a user's predetermined verbal start command is input through the microphone.

The plurality of devices each may further transmit recording state information indicating a recording state in recording the user's speech to the server apparatus and the server apparatus may interpret the contents of the user's speech while performing weighting according to the recording state information in voice-recognizing the two or more of the received recorded data.

The recording state information may include at least one of a recording level, a noise level, and an echo. The recording state information may include all the information of a recording level, a noise level, and an echo.

The server apparatus may further select a device outputting the voice assistant among the plurality of devices according to a predetermined priority.

The predetermined priority may be determined based on one or two or more of a state where the device is in use or not in use, a type of an output unit used in the device, the distance between the device and a user, and the performance of the output unit of the device.

In order to solve the above-described problems to achieve the object, a server apparatus which is communicatively connected to a plurality of devices and performing voice assistant according to a second aspect of some embodiments of the present invention has a communication module for performing data communication with the plurality of devices through a network, a voice recognition module voice-recognizing recorded data of the same user's speech received through the communication module and transmitted from each of the plurality of devices in accordance with a predetermined standard to thereby interpret the contents of the user's speech, and a voice assistant module performing voice assistant according to the contents of the user's speech interpreted in the voice recognition module.

The voice recognition module may interpret the contents of the user's speech while performing weighting according to recording state information indicating the recording state in recording the user's speech transmitted from the plurality of devices in voice-recognizing the recorded data of the same user's speech.

The recording state information may include at least one of a recording level, a noise level, and an echo.

The recording state information may include all the information of a recording level, a noise level, and an echo.

The voice assistant module may select a device outputting the voice assistant among the plurality of devices according to a predetermined priority.

The predetermined priority may be determined based on one or two or more of a state where the device is in use or not in use, the type of an output unit used in the device, the distance between the device and a user, and the performance of the output unit of the device.

In order to solve the above-described problems to achieve the object, a device connected to a server apparatus performing voice assistant so as to enable data communication according to a third aspect of some embodiments of the present invention has a communication module for performing the data communication with the server apparatus through a network, a microphone for inputting a voice, and a request module recording the same user's speech as a user's speech of the other devices through the microphone, and then transmitting recorded data of the same user's speech to the server apparatus through the communication module.

In order to solve the above-described problems to achieve the object, a voice assistant method executed by a server apparatus communicatively connected to a plurality of devices according to a fourth aspect includes a voice recognition process of voice-recognizing the recorded data of the same user's speech received through a communication module and transmitted from each of the plurality of devices in accordance with a predetermined standard to thereby interpret the contents of the user's speech and a voice assistant process of performing voice assistant according to the contents of the user's speech interpreted in the voice recognition process.

In order to solve the above-described problems to achieve the object, a program mounted on a server apparatus communicatively connected to a plurality of devices according to a fifth aspect of some embodiments of the present invention includes causing a computer to execute a voice recognition process of voice-recognizing recorded data of the same user's speech received through a communication module and transmitted from each of the plurality of devices in accordance with a predetermined standard to thereby interpret the contents of the user's speech and a voice assistant process of performing voice assistant according to the contents of the user's speech interpreted in the voice recognition process.

Some aspects of embodiments of the present invention exhibit an effect of allowing a user to easily utilize the voice assistant without hesitation in determining which device usable for the voice assistant is used when there are two or more of the devices.

FIG. 1 is a figure illustrating a conceptual diagram of a voice assistant system according to this embodiment. As illustrated in FIG. 1, a voice assistant system 1 according to this embodiment is configured so that a server apparatus 10 and a plurality of devices 20 can perform data communication through a network 30.

The server apparatus 10 executes the voice assistant according to a voice assistant request from the devices 20. The devices 20 transmit the voice assistant request to the server apparatus 10. The devices 20 are, for example, a laptop PC, a desktop PC, a smartphone, a phablet, a tablet, a smart watch, an Internet TV, a Home hub, a PDA, a cellular phone, various home electronics, and the like.

The network 30 has a function of connecting the server apparatus 10 and the plurality of devices 20 communicatively with each other and is the Internet, a wired or wireless LAN (Local Area Network), or the like, for example.

In this embodiment, the plurality of devices 20 each records a user's speech through a microphone at the same time, and then transmits the recorded user's speech (recorded data) to the server apparatus 10. The server apparatus 10 voice-recognizes the plurality of recorded data transmitted from the plurality of devices 20 to interpret the contents of the user's speech, and then executes the voice assistant through the devices 20. This prevents a user from hesitating in determining which device 20 usable for the voice assistant is utilized for the voice assistant, even when there are two or more of the devices 20.

As illustrated in FIG. 1, the server apparatus 10 has a communication portion 11 (or communication module 11) for performing data communication with the plurality of devices 20 through the network 30, a voice recognition portion 12 (or voice recognition module 12) voice-recognizing a plurality of recorded data of the same user's speech received through the communication module 11 and transmitted from each of the plurality of devices 20 in accordance with a predetermined standard to thereby interpret the contents of the user's speech, a voice assistant portion 13 (or voice assistant module 13) executing voice assistant according to the contents of the user's speech interpreted in the voice recognition module 12, and a storage portion 14 (or storage module 14).

The voice recognition module 12 may interpret the contents of the user's speech while performing weighting according to recording state information indicating the recording state in recording the user's speech sent out from the plurality of devices 20 in voice-recognizing the plurality of recorded data of the user's speech.

The voice assistant module 13 may select the device outputting the voice assistant among the plurality of devices 20 according to a predetermined priority. The predetermined priority may be determined based on one or two or more of a state where the device 20 is in use or not in use, the type of an output unit used in the device 20, the distance between the device 20 and the user, and the performance the output unit of the device 20.

The storage module 14 may have a device table 14a in which user names utilizing the voice assistant and device information on the plurality of devices used by the users are registered so as to correspond to each other. The device information may include a device name, a model name, an IP address, and the type and the specification of the output unit to be mounted (for example, in the case of a speaker, output sound pressure level, frequency characteristics, crossover frequency, input impedance, allowable input, and the like, and, in the case of a display, screen size, resolution, and the like). In this embodiment, a user utilizing the voice assistant of the server apparatus 10 and device information therefore are registered in the device table 14a beforehand. The voice assistant module 13 may register the user names and the device information in the device table 14a according to a request from the devices 20.

In the server apparatus 10, the voice recognition module 12 and the voice assistant module 13 can be configured by modules of hardware or software (programs, such as OS, API, service, utility, library, driver, and application) or a combination thereof, for example. The computer may realize the functions of the voice recognition module 12 and the voice assistant module 13 by executing the programs.

As illustrated in FIG. 1, the plurality of devices 20 each has a communication portion 21 (or communication module 21) for performing data communication with the server apparatus 10 through the network 30, a microphone 22 for inputting a voice, and a request portion 23 (or request module 23) recording a user's speech through the microphone 22, and then transmitting data of the recorded user's speech (recorded data) to the server apparatus 10 through the communication module 21, and an output unit 24.

The output unit 24 contains one or two or more of a monitor, such as a liquid crystal display, an organic EL display, a plasma display, and an CRT, a headset containing a speaker and an earphone or a headphone, a printer, and the like and has a function of outputting information and a voice to the outside. The type and the specification of the mounted output unit 24 vary depending on the devices 20.

The microphone 22 includes a single microphone, a dual microphone, array microphones, and the like, for example, and collects and inputs voices, such as a user's speech.

When a user's predetermined verbal start command (e.g., Hello, oo) is input through the microphone 22, for example, the request module 23 may record a user's speech after the input, and then transmit the recorded data of the user's speech (recorded data) to the server apparatus 10 through the communication module 21. Thus, the use of the same keyword (verbal start command) in the plurality of devices 20 eliminates the necessity for the user to memorize keywords for the devices, which is convenient for the user.

The request module 23 may transmit the recording state information indicating the recording state in recording the user's speech to the server apparatus 10 through the communication module 21. The recording state information may include one or two or more of a recording level, a noise level, the influence of echoes, the distance from the user (sound source of the speech), and the direction of the user (sound source of the speech), for example.

The request module 23 may also transmit usage state information indicating the usage state of the devices 20 in recording the user's speech. The usage state information may include information, such as a state where the device 20 is in use or not in use, an output unit currently used in the device 20, and the distance between the device 20 and the user, for example.

In the devices 20, the request module 23 can be configured by modules of hardware or software (programs, such as OS, API, service, utility, library, driver, and application) or a combination thereof, for example. The functions of the request module 23 may be realized by the execution of the programs by a computer.

Figure 2:
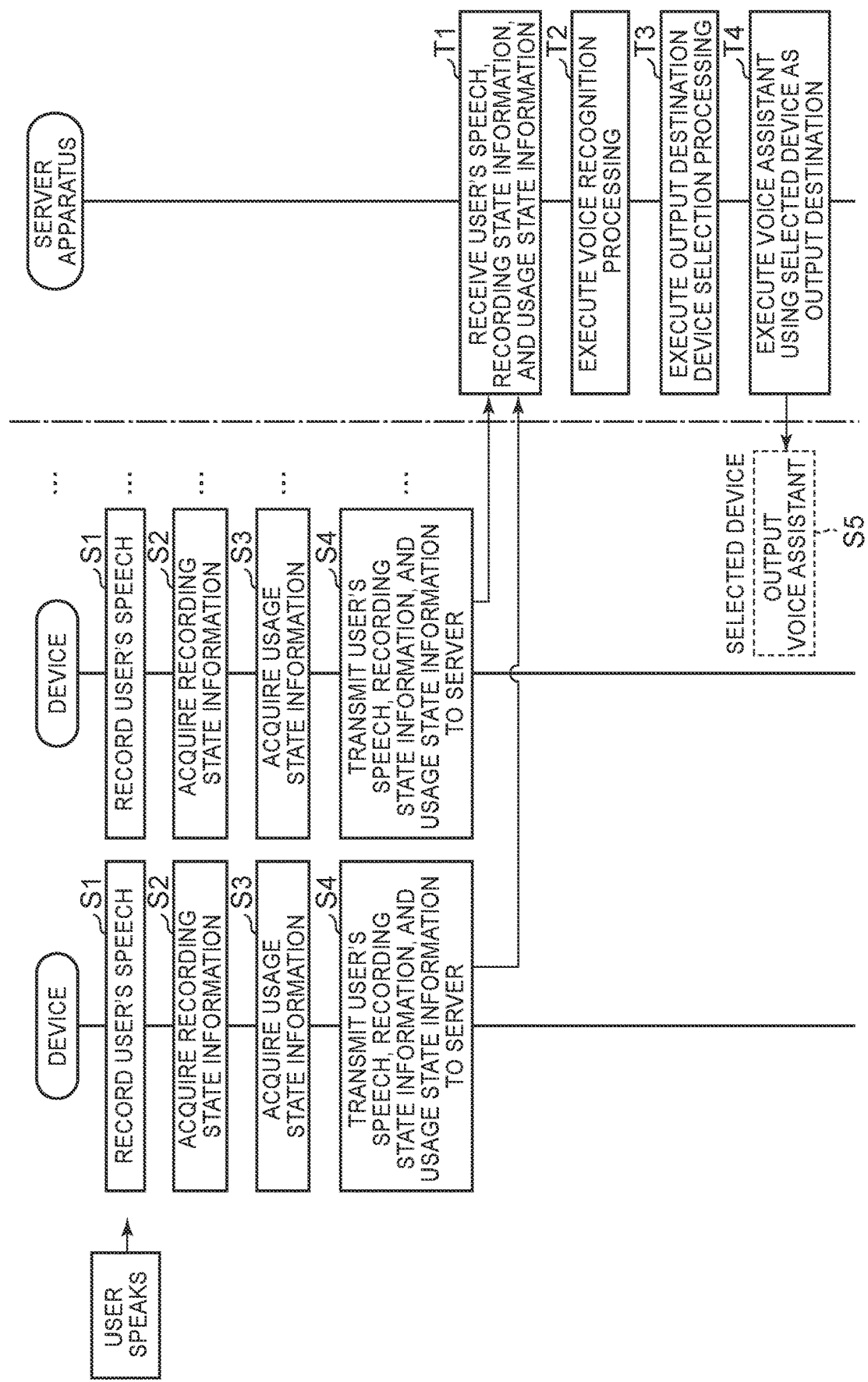
FIG. 2 is a flow chart for describing the outline of an operation of the voice assistant system of FIG. 1 according to one or more embodiments of the present disclosure.

FIG. 2 is a flow chart for describing the outline of an example of an operation of the voice assistant system 1 of FIG. 1. The outline of an example of the operation of the voice assistant system 1 of FIG. 1 is described with reference to FIG. 2.

In FIG. 2, each request module 23 records a user's speech through the microphone 22 when a user speaks in the plurality of devices 20 (Step S1). When the user's predetermined verbal start command (for example, Hello, oo) is input, for example, the request module 23 may start an operation to record the contents of the subsequent user's speech.

Each request module 23 acquires the recording state information indicating the recording state in recording the user's speech (Step S2). Furthermore, each request module 23 acquires the usage state information indicating the current usage state of the device (Step S3).

Each request module 23 transmits the recorded user's speech (recorded data), the recording state information, and the usage state information to the server apparatus 10 through the communication module 21 (Step S4).

In the server apparatus 10, the voice recognition module 12 receives the recorded user's speech (recorded data), the recording state information, and the usage state information sent out from the plurality of devices 20 through the communication module 11 (Step T1).

The voice recognition module 12 executes voice recognition processing about the plurality of received recorded data (Step T2). Specifically, in the voice recognition processing, the contents of a final user's speech are interpreted while performing weighting according to the recording state information in voice-recognizing the plurality of recorded data.

Next, the voice assistant module 13 executes output destination device selection processing of selecting the device outputting the voice assistant from the plurality of devices 20 (Step T3). Specifically, in the output destination device selection processing, the device outputting the voice assistant among the plurality of devices 20 is selected according to a predetermined priority with reference to the usage state information received from the plurality of devices 20 and the corresponding device information (the type and the specification of the output units mounted on the devices 20) registered in the storage module 14. The device outputting the voice assistant is not limited to the device sending out the recorded data and the other devices may be selected.

The voice assistant module 13 executes the voice assistant using the selected device 20 as the output destination (Step T4). The selected device outputs the voice assistant (Step S5).

Figure 3:
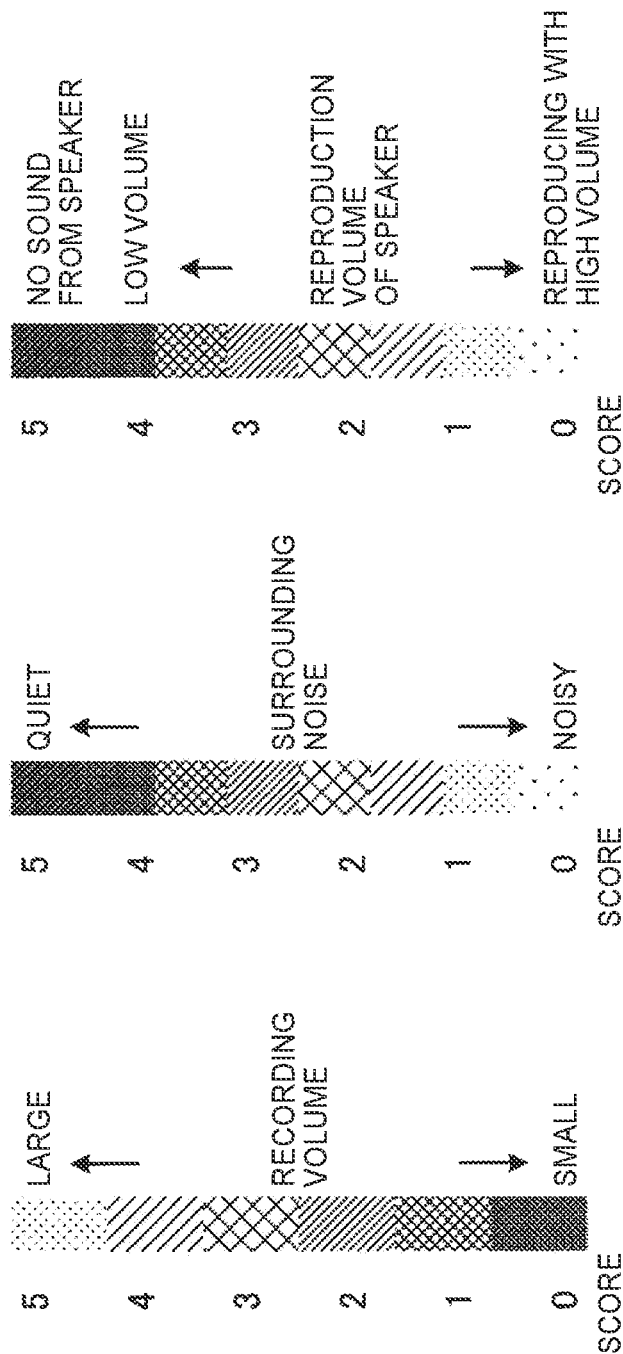
FIG. 3 is a figure for describing the reliability (weighting) of a device according to one or more embodiments of the present disclosure.
Figure 4:
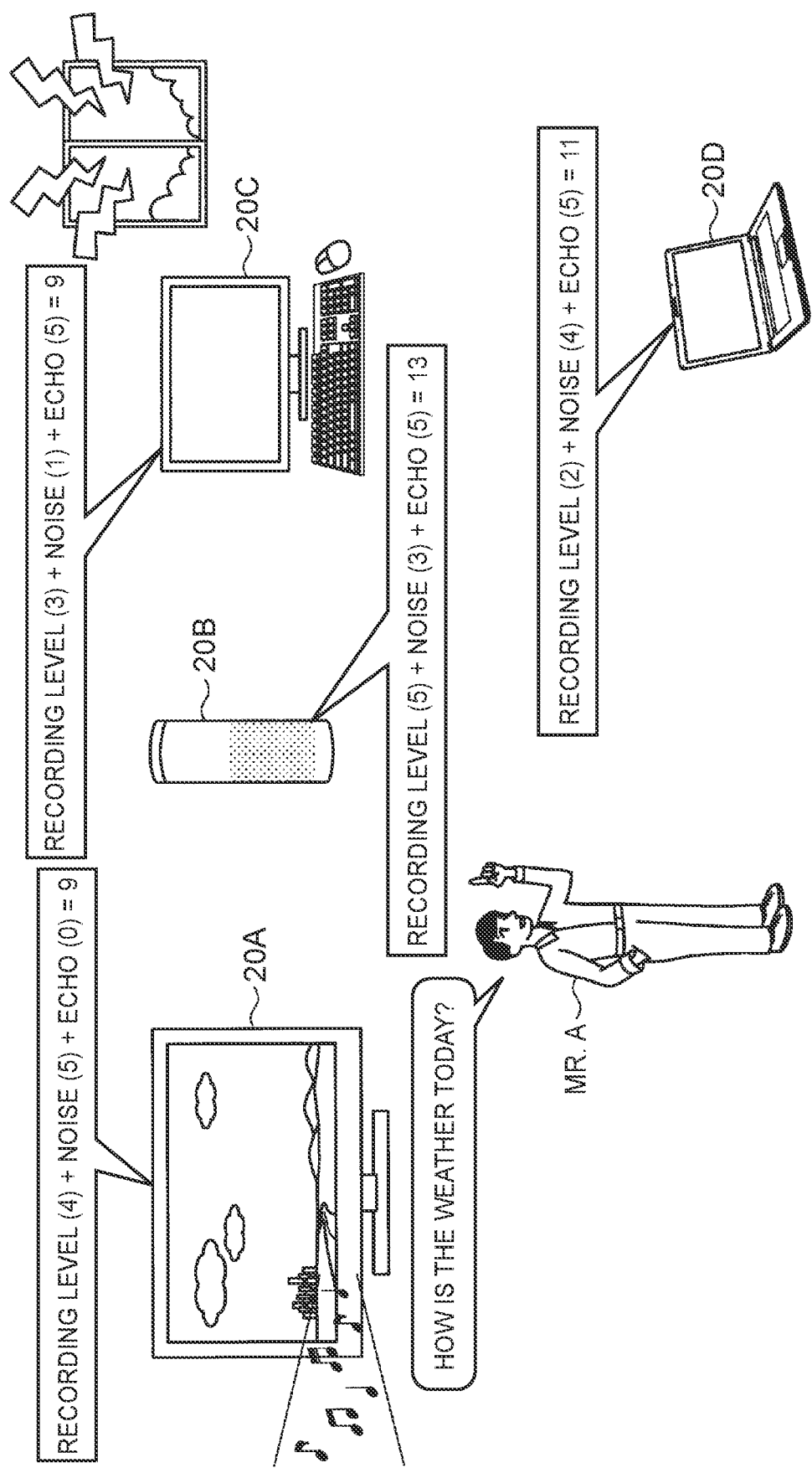
FIG. 4 is a figure for describing a case where a user's speech is recorded by a plurality of devices according to one or more embodiments of the present disclosure.
Figure 5:
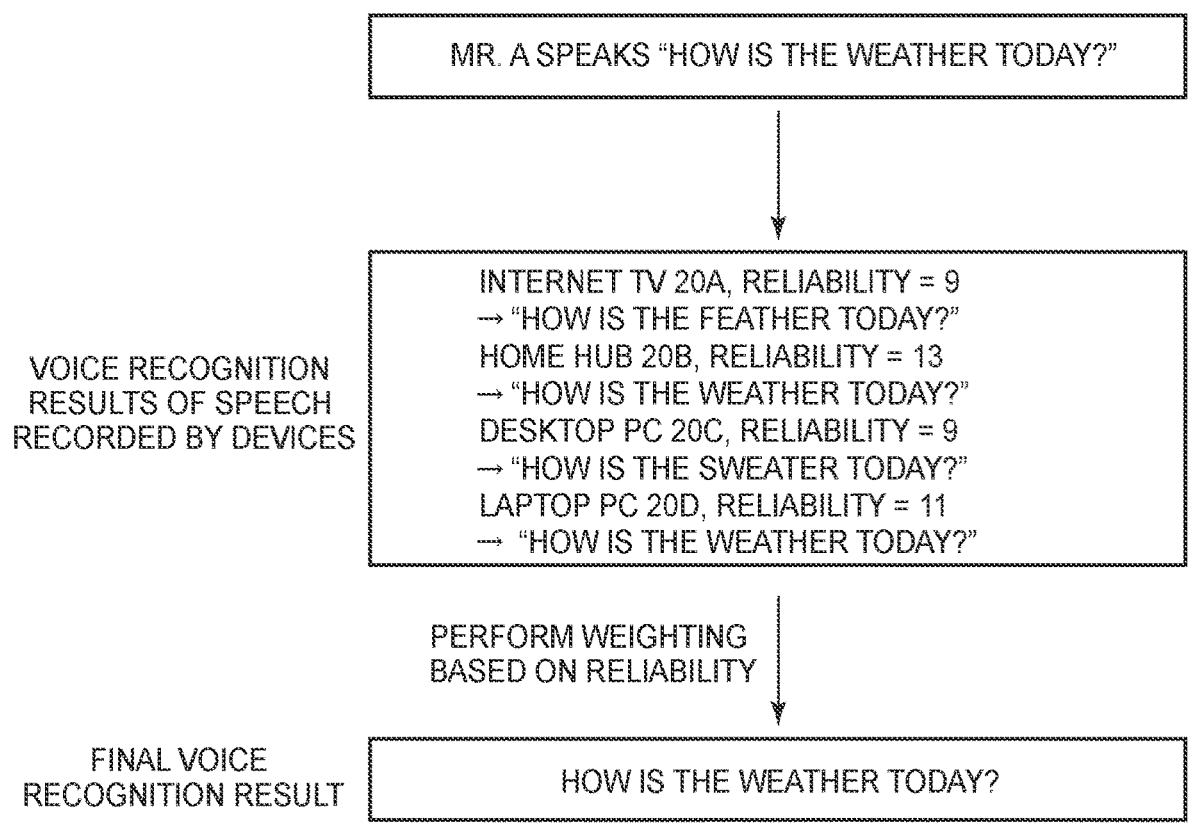
FIG. 5 is a figure for describing the reliability of the devices and a final voice recognition result of a voice recognition module of a server apparatus according to one or more embodiments of the present disclosure.

FIG. 3 to FIG. 5 are explanatory drawings for describing an example of the voice recognition processing (Step T2 of FIG. 2) executed by the voice recognition module 12 of the server apparatus 10. A specific example of the voice recognition processing executed by the voice recognition module 12 of the server apparatus 10 is described with reference to FIG. 3 to FIG. 5.

FIG. 3 is a figure for describing the reliability (weighting) of the devices 20. The reliability of the devices 20 can be calculated by Reliability=Recording level score+Noise level score+Score of influence of echoes. The reliability becomes higher when the score is higher. The recording level has a range of the scores 0 to 5, and the score is higher when the recording volume is larger. The noise level has a range of the scores 0 to 5, and the score is higher when the surrounding noise is less. With respect to the influence of echoes, the score is higher when a sound output from a speaker is lower.

The request module 23 of each device 20 may transmit the information on the recording level, the noise level, and the influence of echoes to the server apparatus 10 as the recording state information, for example. The voice recognition module 12 of the server apparatus 10 may calculate the reliability of each device 20 based on recording state information. The request module 23 of each device 20 may calculate Reliability=Recording level score+Noise level score+Score of influence of echoes, and then transmit the reliability to the server apparatus 10 as the recording state information.

FIG. 4 is a figure for describing a case of recording a user's speech by the plurality of devices 20. In FIG. 4, it is supposed that an Internet TV 20A, a Home hub 20B, a desktop PC 20C, and a Laptop PC 20D are disposed as the plurality of devices 20 in Mr. A's room. Mr. A speaks the predetermined verbal start command (for example, Hello, ○○, and then he speaks (asks) "How is the weather today?", for example.

With respect to the Internet TV 20A, the Internet TV 20A is close to Mr. A and the surrounding noise is also small but a speaker is in use and there is an echo, for example, and therefore Reliability=Recording level (4)+Noise (5)+Echo (0)=9 is given.

With respect to the Home hub 20B, the Home hub 20B is close to Mr. A and is free from an echo and the surrounding noise has an intermediate level, for example, and therefore Reliability=Recording level (5)+Noise (3)+Echo (5)=13 is given.

With respect to the desktop PC 20C, the recording level is an intermediate level and a speaker is not used but the surroundings are noisy, for example, and therefore Reliability=Recording level (3)+Noise (1)+Echo (5)=9 is given.

With respect to the Laptop PC 20D, the Laptop PC 20D is free from the influence of echoes and the surrounding noise is also low but the Laptop PC 20D is distant from Mr.

A and the recording volume is small, for example, and therefore Reliability=Recording level (2)+Noise (4)+Echo (5)=11 is given.

In this example, the reliability becomes higher in the order of Home hub 20B (Reliability=13)>Laptop PC 20D (Reliability=11)>Internet TV 20 A (Reliability=9)=Desktop PC 20C (Reliability=9).

FIG. 5 is a figure for describing the reliability of the devices 20 and the final voice recognition result of the voice recognition module 12 of the server apparatus 10. In FIG. 5, results of individually voice-recognizing the speech of Mr. A of "How is the weather today?" recorded with the Internet TV 20A, the Home hub 20B, the desktop PC 20C, and the Laptop PC 20D with the voice recognition module 12 of the server apparatus 10 are "How is the feather Today?", "How is the weather today?", "How is the sweater today?", and "How is the weather today?", respectively, for example. With respect to a portion where all the voice recognition results are the same in all the devices, for example, the voice recognition module 12 may adopt the portion where the results are the same. With respect to different portions, the weighting based on the evaluation values may be performed (for example, the result in which the evaluation value is equal to or higher than a predetermined value may be adopted or the result in which the evaluation value is the highest may be adopted).

In FIG. 5, the portions of "today" are all the same, and therefore the result may be adopted. The portion of "weather?" includes various words as follows: "feather?", "weather?", "sweater?", and "weather?", and therefore the results "weather?" of the Home hub 20B (Reliability=13) and the Laptop PC 20D (Reliability=11) with high reliability may be adopted. Then, the voice recognition module 12 may adopt "How is the weather today?" as the final voice recognition result.

Figure 6:
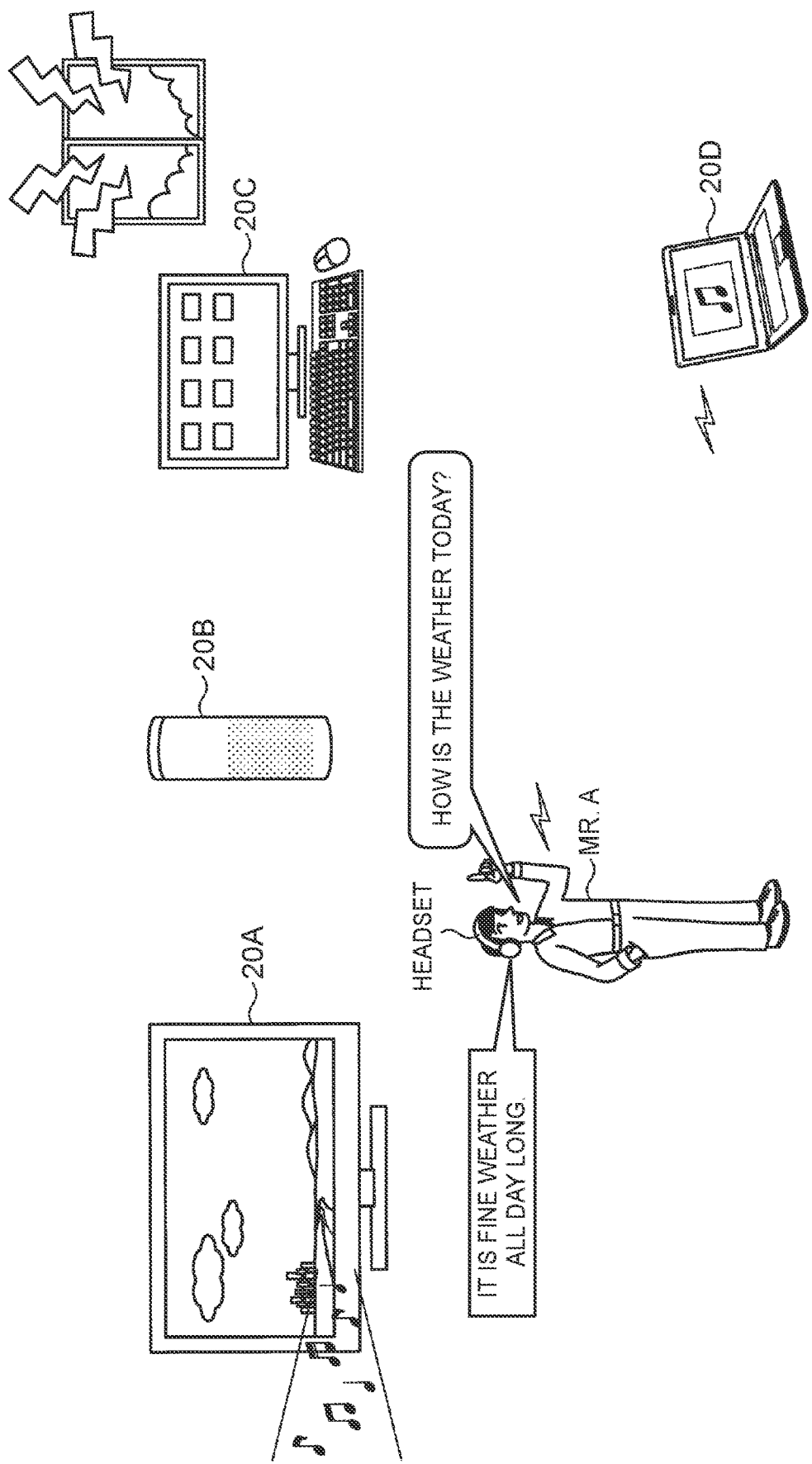
FIG. 6 is an explanatory view for describing a specific example of output destination device selection processing executed by a voice assistant module of the server apparatus according to one or more embodiments of the present disclosure.

FIG. 6 is an explanatory view for describing a specific example of the output destination device selection processing (Step T4 of FIG. 2) executed by the voice assistant module 13 of the server apparatus 10. The specific example of the output destination device selection processing executed by the voice assistant module 13 of the server apparatus 100 is described with reference to FIG. 6.

The voice assistant module 13 can set the priority of selecting the output destination device as follows: 1. Usage state of the device (in use or not in use), 2. Type of a voice output unit used in the device, 3. Position of the device (distance from a user), and 4. Order of the performance of the voice output unit of the device, for example.

More specifically, with respect to "1. Usage state of the device (in use or not in use)", it is determined whether the device is powered on, for example, and then the device which is powered on and is in use is preferentially used. This is because the output cannot be performed from the device which is not powered on.

With respect to "2. Type of the voice output unit used in the device", the priority is given to the headset over the speaker when the headset is used. This is because, when the user uses the headset, the user expects the output from the headset.

With respect to "3. Position of the device (distance from a user)", the distance from the user is classified into rough distance ranges of a short distance (e.g., 0 to 2 m), an intermediate distance (e.g., 2 to 5 m), and a long distance (e.g., 5 m or more), and then the priority is set to Short distance>Intermediate distance>Long distance.

With respect to "4. Order of the performance of the voice output unit of the device", when the distance range in 3 above is the same and the voice output unit to be used is a speaker, for example, the device carrying a speaker capable of outputting the loudest sound (allowable input is the highest) may be preferentially selected. When the output unit to be used is a monitor, the device carrying a monitor with the largest screen size may be preferentially selected.

In FIG. 6, the Internet TV 20A, the Home hub 20B, the desktop PC 20C, and the Laptop PC 20D are all powered on and are in use. When Mr. A uses the headset (wireless) with the Laptop PC 20D, the voice assistant module 13 selects the Laptop PC 20D as the output destination device of the voice assistant. The voice assistant module 13 transmits an answer (for example, "It is fine weather all day long.") of the voice assistant to the Laptop PC 20D, and then the Laptop PC 20D outputs the answer (for example, "It is fine weather all day long.") of the voice assistant from the headset.

As described above, according to this embodiment, the plurality of devices 20 each record the same user's speech through the microphone 22, and then transmits recorded data of the same user's speech to the server apparatus 10. Then, the server apparatus 10 voice-recognizes the recorded data transmitted from each of the plurality of devices 20 in accordance with a predetermined standard to thereby interpret the contents of the user's speech to perform the voice assistant. This enables a user to easily utilize the voice assistant without hesitation in determining which device callable of utilizing the voice assistant is used even when there are two or more of the devices usable for the voice assistant. Moreover, the voice recognition for the same user's speech is performed using the recorded data of the plurality of devices, and therefore the accuracy of the voice recognition can be increased.

Moreover, according to this embodiment, the plurality of devices 20 may start the recording of the user's speech after the user's predetermined verbal start command is input through the microphone 22. This makes it possible for a user to utilize the voice assistant using the same keyword (verbal start command) and eliminates the necessity of memorizing different keywords for the devices, which is convenient.

Moreover, according to this embodiment, the plurality of devices 20 each may transmit the recording state information indicating the recording state in recording the user's speech to the server apparatus 10 and the server apparatus 10 may perform weighting according to the recording state information to interpret the contents of the user's speech in voice-recognizing the plurality of recorded data. This makes it possible to further increase the accuracy of the voice recognition by performing weighting according to the recording state.

Moreover, according to this embodiment, the recording state information may include one or two or more of information of the recording level, the noise level, and the influence of echoes. This makes it possible to perform the voice recognition considering the recording level, the noise level, or the influence of echoes in recording.

Moreover, according to this embodiment, the server apparatus 10 may select the device outputting the voice assistant among the plurality of devices according to the predetermined priority. This makes it possible to select the device suitable as the output destination of the voice assistant.

Moreover, according to this embodiment, the predetermined priority may be determined based on one or two or more of the usage state of the device (in use or not in use), the output unit used in the device, the distance between the device and the user, and the performance of the output unit of the device. This makes it possible to output the voice assistant from a more preferable device for a user.

Hardware Configuration Example

Figure 7:
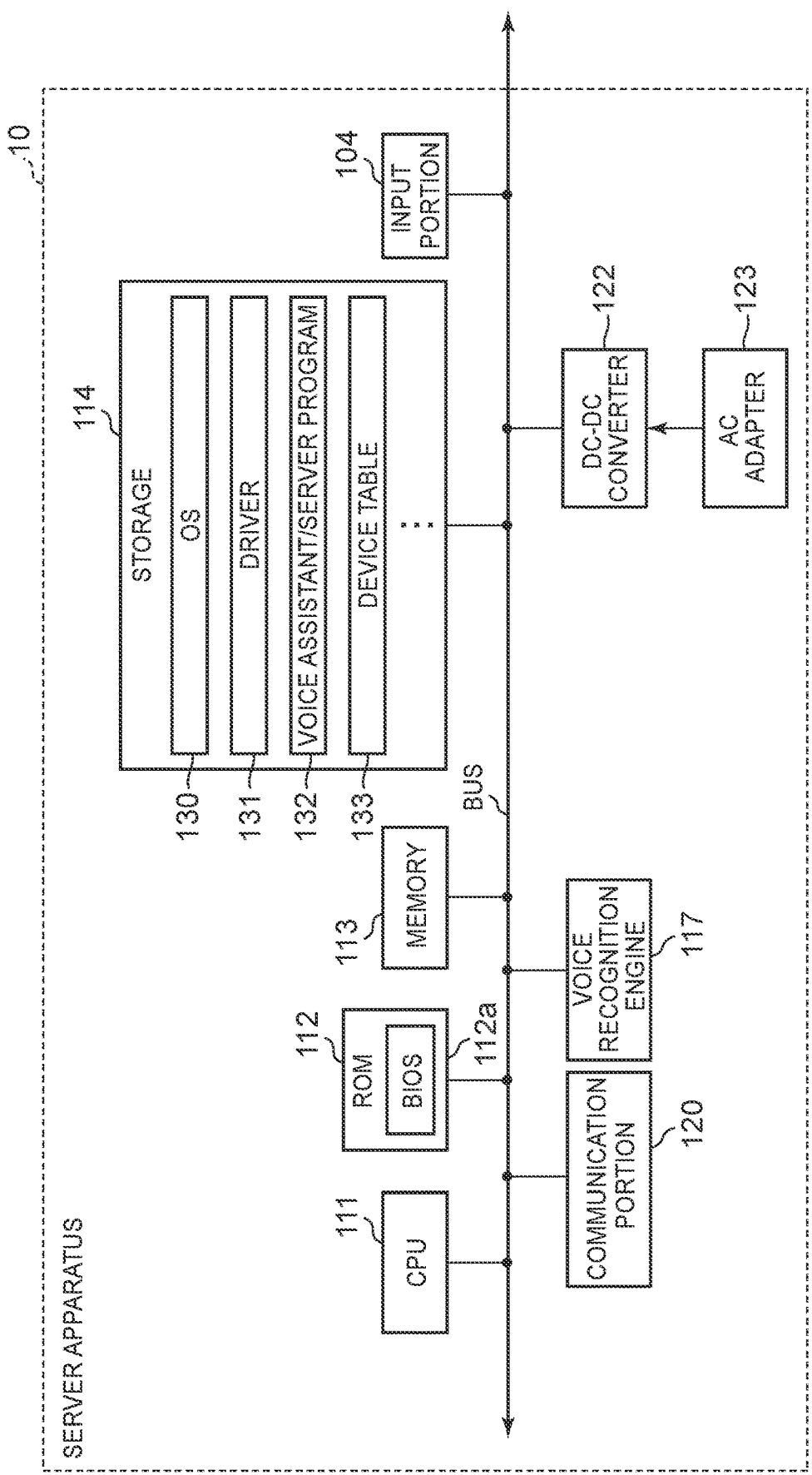
FIG. 7 is a figure for describing a hardware configuration example of the server apparatus of FIG. 1 according to one or more embodiments of the present disclosure.
Figure 8:
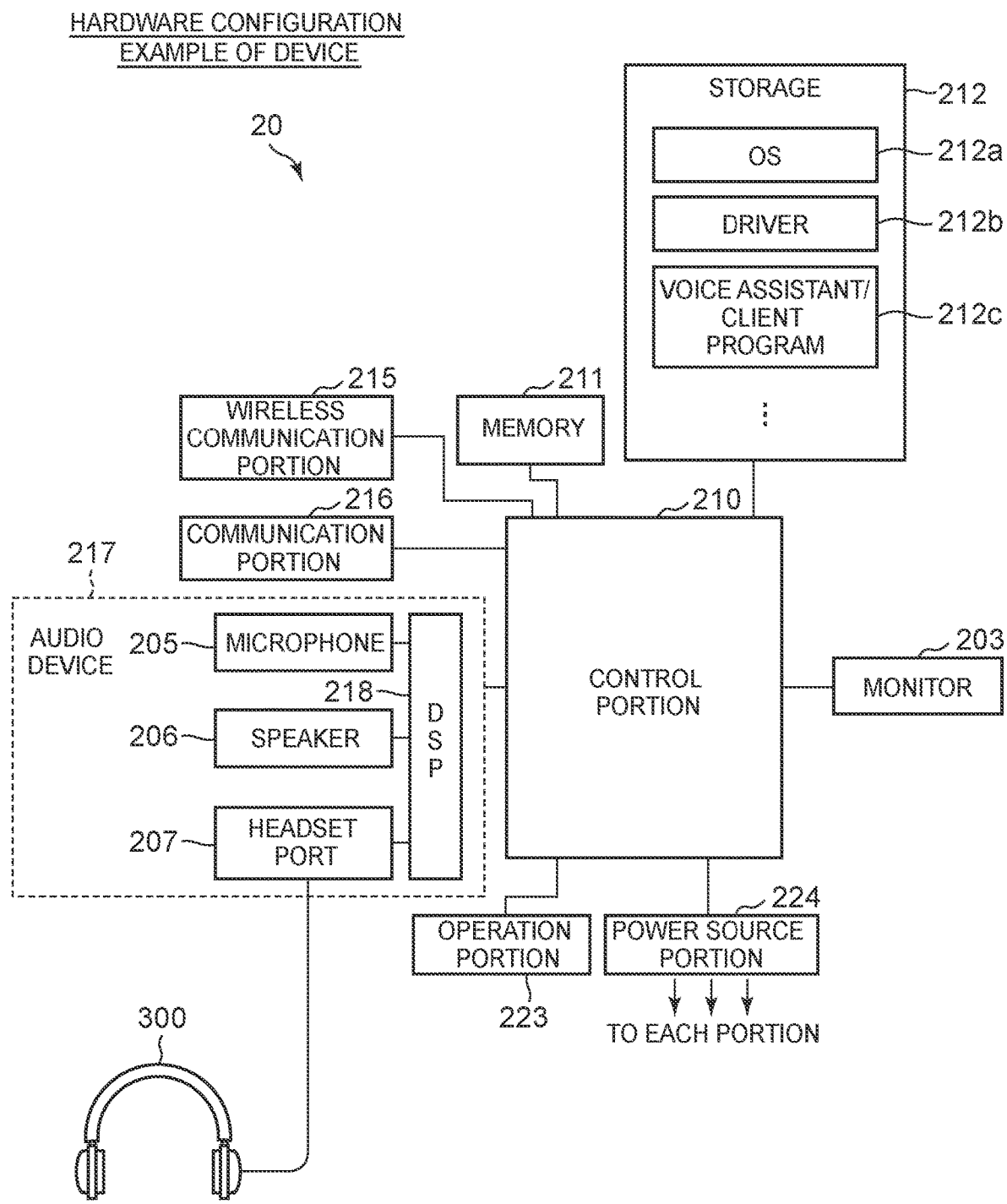
FIG. 8 is a figure illustrating a hardware configuration example of the device of FIG. 1 according to one or more embodiments of the present disclosure.

Hardware configuration examples of the voice assistant system 1 according to the above-described embodiment are described with reference to FIG. 7 and FIG. 8. FIG. 7 is a figure for describing the hardware configuration example of the server apparatus 10 of FIG. 1. FIG. 8 is a figure illustrating the hardware configuration example of the device 20 of FIG. 1.

As illustrated in FIG. 7, the server apparatus 1 has a CPU 111, a ROM 112, a memory 113, a storage 114, an input portion 104 (or input module 104), a voice recognition engine 117, a communication portion 120 (or communication module 120), a DC-DC converter 122, an AC adaptor 123, and the like and the modules are connected directly or indirectly through a bus.

The CPU 111 controls the entire server apparatus 10 by an OS 130 stored in the storage 114 connected through the bus and manages a function of executing processing based on various programs stored in the storage 114. The ROM 112 stores a BIOS (Basic Input/Output System) 112a, data, and the like.

The memory 113 contains a cache memory or a RAM and is a writable memory to be utilized as a read area of execution programs of the CPU 111 or a work area where processing data of the execution programs is written.

The storage 114 contains a nonvolatile storage device, such as an SSD or an HDD, for example, and has the OS 130 for controlling the entire server apparatus 10 of the Windows (Registered Trademark) and the like, various drivers 131 for hardware-operating peripherals, a voice assistant/server program 132, a device table 133 for registering user names and device information, the other applications (not illustrated), and the like, for example.

The voice assistant/server program 132 is an application for voice-recognizing recorded data of a user's speech transmitted from the plurality of devices 20, and providing voice assistant to the user. When the voice assistant/server program 132 receives the recorded data (including recording state information and usage state information) of the user's speech through the communication module 120 from the plurality of devices 20, the voice assistant/server program 132 causes the voice recognition engine 117 to execute the voice recognition processing (for example, refer to Step T2 of FIG. 2) and executes the output destination device selection processing (for example, refer to Step T3 of FIG. 2), and then executes the voice assistant based on the final voice recognition result of the voice recognition engine 117 through an output destination device selected by the output destination device selection processing.

The input module 104 is a user interface for a user to perform an input operation and has a keyboard containing various keys inputting characters, commands, and the like, for example.

The voice recognition engine 117 is used for voice-recognizing the recorded user's speech (recorded data) to interpret the contents of the user's speech (converted into a text), and specifically performs sound analysis of the recorded data, and then converts the resultant recorded data into a text using an acoustic model, a language model, and voice recognition dictionaries, such as a pronunciation dictionary. The voice recognition engine 117 executes the voice recognition processing (for example, refer to Step T2 of FIG. 2) according to an instruction of the voice assistant/server program 132.

The communication module 120 is used for performing data communication with the plurality of devices 20 by cable or radio through a network.

The AC adaptor 123 is connected to a commercial power source to convert an AC voltage into a DC voltage, and then outputs the DC voltage to the DC-DC converter 122. The DC-DC converter 122 converts the DC voltage supplied from the AC adaptor 123 into a predetermined voltage, and then supplies power to each module.

In the above-described configuration, the CPU 111, the voice assistant/server program 132, and the voice recognition engine 117 can realize the functions of the voice recognition module 12 of FIG. 1. Moreover, the CPU 111 and the voice assistant/server program 132 can realize the functions of the voice assistant module 13 of FIG. 1.

As illustrated in FIG. 8, the device 20 has a control portion 210 (or control module 210), a memory 211, a storage 212, a wireless communication portion 215 (or wireless communication module 215), the communication portion 216 (or communication module 216), an audio device 217, a power source portion 224 (or power source module 224), a monitor 203, an operation portion 223 (or operation module 223), and the like.

The monitor 203 contains a liquid crystal display (LCD), an organic EL (Organic Electro-Luminescence) panel, or the like and displays characters, figures, and the like, for example.

The operation module 223 receives a user's operation through various buttons and the like, and then transmits an instruction signal corresponding to the received operation to the control module 210.

The power source module 224 supplies power obtained from a storage battery or an AC adaptor 123 to each module of the devices 20 including the control module 210 according to the control of the control module 210.

The communication module 216 is used for performing data communication with the server apparatus 10 through a network.

The wireless communication module 215 performs communication based on the communication standard of the Bluetooth (Registered Trademark) or communication based on the communication standard of the Wi-Fi (Wireless Fidelity).

The audio device 217 has a microphone 205, a speaker 206, a headset port 207, and a DSP 218.

The microphone 205 contains array microphones and collects a voice, and then outputs voice data to the DSP 218, for example. The speaker 206 outputs a voice according to the voice data output from the DSP 218. The headset port 207 is used for connecting the headset 300 by cable or radio and outputs the voice data output from the DSP 218 to the headset 300.

The DSP 218 has an A/D converter, a D/A converter, an amplifier, a voice processing LSI containing various filters and the like, a memory, and the like and A/D-converts a voice input from the microphone 205, performs voice processing, and then outputs voice data (digital data) after the voice processing to the control module 210 or D/A-converts voice data (digital) input from the control module 210, and then causes the speaker 206 or the headset port 207 to output the resultant voice data.

The DSP 218 has a wake on voice function and power is supplied from the power source module 224 even in a sleep state, and thus is configured so as to be able to collect a voice from the microphone 205 even in the sleep state.

The DSP 218 can calculate position information (position (relative position to the microphone 205) and direction of the sound source) of a voice to be input from the microphone (for example, array microphones) 205 from a arrival time difference of the sound of the microphones, and thus can determine the distance from a user (sound source) and the direction of a user (sound source).

The memory 211 contains a RAM, a DRAM, or the like, for example, and is used as a work area where programs to be executed by the control module 210, data to which the control module 210 refers, calculation results of the control module 210, and the like are temporarily memorized.

The storage 212 is a nonvolatile memory (for example, EEPROM, SSD), for example, and stores programs or data to be utilized for processing in the control module 210. The programs stored in the storage 212 include an OS 212a for realizing the functions of the devices 20, a driver 212b for hardware-controlling the devices 20, a voice assistant/client program (application) 212c for using the voice assistant of the server apparatus 10, the other applications (not illustrated), various data, and the like. The OS 212a is interposed in the communication between various applications and the devices.

The control module 210 is a CPU (Central Processing Unit), a microprocessor, a DSP, or the like, for example, and comprehensively controls the operation of the devices 20 to realize various functions (modes). Specifically, the control module 210 executes instructions included in the programs stored in the storage 212 referring to data stored in the storage 212 or data developed in the memory 211 as necessary, and then controls the monitor 203, the wireless communication module 215, the communication module 216, the audio device 217, and the like to thereby realize various functions (modes). The programs to be executed by the control module 210 and the data to which the control module 210 refers may be downloaded or uploaded from the server apparatus 10 by communication by the communication module 216 or the wireless communication module 215.

The voice assistant/client program (application) 212c records a user's speech after a user's predetermined verbal start command is input through the audio device 217, and then transmits recorded data of the user's speech to the server apparatus 10. Moreover, the voice assistant/client program (application) 212c acquires the recording state information from the audio device 217, and then transmits the same to the server apparatus 10 or acquires the operation state information from the OS 212a, and then transmits the same to the server apparatus 10, for example. Furthermore, when there is an instruction of outputting the voice assistant from the server apparatus 10, the voice assistant/client program a (application) 212c causes the speaker 206 or the headset 300 to output the same in voice through the DSP 218 or causes the monitor 203 to display the same.

In the above-described configuration, the control module 210, the audio device 217, the voice assistant/client program (application) 212c, and the like can realize the functions of the request module 23 of FIG. 1. Moreover, the audio device 217 or the monitor 203 can realize the functions of the output unit 24 of FIG. 1.

Some embodiments of a device are disclosed herein. In an embodiment, a device, which is connected to a server apparatus performing voice assistant so as to enable data communication, includes a communication module for performing the data communication with the server apparatus through a network. The device further includes a microphone for inputting a voice and a request module recording a same user's speech as a speech of the other devices through the microphone, and then transmitting recorded data of the same user's speech to the server apparatus through the communication module.

Some embodiments of a voice assistant method are disclosed herein. In an embodiment, a voice assistant method, which is executed by a server apparatus communicatively connected to a plurality of devices, includes a voice recognition process of voice-recognizing recorded data of a same user's speech received through a communication module and transmitted from each of the plurality of devices in accordance with a predetermined standard to thereby interpret a content of the user's speech. The method further includes a voice assistant process of performing voice assistant according to the content of the user's speech interpreted in the voice recognition process.

The above-described embodiments are made for illustrative purposes and are not made for limiting the interpretation of other embodiments of the present invention. Respective elements that the embodiments including arrangements, materials, conditions, shapes, sizes and so forth of the elements are not limited to the ones which are exemplarily illustrated in the drawings and may be appropriately altered and modified. In addition, it is possible to partially displace and/or combine configurations which are described in different embodiments with each other or one another.

Although various embodiments have been described herein, the technical scope of the various embodiments are not limited to the scope specifically described above. That is, various modifications and/or improvements may be made to the various embodiments without departing from the spirit of this disclosure. As such, embodiments in which modifications and/or improvements have been made are also included in the technical scope of the various embodiments.

The foregoing description has been directed to various embodiments illustrated in the drawings. The scope of the various embodiments, however, is not limited to the illustrated embodiments, and may, of course, employ any known configuration as long as the advantages of the various embodiments can be obtained. Furthermore, the flow of the methods described in the above embodiments are merely an example, and an unnecessary block may be deleted, a new block may be added, and/or a processing order may be changed without departing from the spirit of the method.

What is claimed is:
1. A system comprising:
a server apparatus performing a voice assistant function; and
a plurality of devices communicatively connected to each other and the server apparatus,
wherein,
the plurality of devices each records a user's speech through a microphone on each device, and then each transmits recorded data of the user's speech to the server apparatus,
the server apparatus receives the recorded data transmitted from each of the plurality of devices, and then voice-recognizes two or more of the received recorded data in accordance with a predetermined standard to thereby interpret a content of the user's speech to perform the voice assistant, and
the server apparatus selects a device outputting the voice assistant among the plurality of devices according to a predetermined priority, the predetermined priority determined based on analyzing different factors for each of the plurality of devices, the factors comprising a state where the device is in use or not in use, a type of an output unit used in the device, a distance between the device and a user, and performance of the output unit of the device, the server apparatus analyzing the different factors in the foregoing order.

2. The system according to claim 1, wherein:
the plurality of devices starts the recording of the user's speech after a user's predetermined verbal start command is input through the microphone of a device of the plurality of devices.

3. The system according to claim 1, wherein:
the plurality of devices each further transmits recording state information indicating a recording state in recording the user's speech to the server apparatus.

4. The system according to claim 3, wherein:
the server apparatus interprets the content of the user's speech while performing weighting of the received recorded data according to the recording state information of the two or more of the received recorded data.

5. The system according to claim 4, wherein:
the recording state information includes at least one of a recording level, a noise level, and an echo.

6. The system according to claim 4, wherein:
the recording state information includes all information of a recording level, a noise level, and an echo.

7. The system of claim 6, wherein the recording state describes a reliability of the plurality of devices, the reliability comprising a sum of values representing the recording level, the noise level, and the echo.

8. The system of claim 1, wherein:
the type of output unit used in the device refers to whether a headset or speaker is being used, with priority given to the headset over the speaker;
the distance between the device and the user is classified into distance ranges, where shorter distance ranges are given priority over longer distance ranges; and
the performance of the output unit of the device refers to giving priority to a device with an output unit that is loudest or largest.

9. An apparatus comprising:
a communication module for performing data communication with a plurality of devices through a network;
a voice recognition module for voice-recognizing recorded data of a same user's speech received through the communication module and transmitted from each of the plurality of devices in accordance with a predetermined standard to thereby interpret a content of the user's speech; and
a voice assistant module for:
performing voice assistant according to the content of the user's speech interpreted in the voice recognition module; and
selecting a device for outputting the voice assistant among the plurality of devices according to a predetermined priority, the predetermined priority determined based on analyzing different factors for each of the plurality of devices, the factors comprising a state where the device is in use or not in use, a type of an output unit used in the device, a distance between the device and a user, and performance of the output unit of the device, the server apparatus analyzing the different factors in the foregoing order.

10. The apparatus according to claim 9, wherein:
the voice recognition module interprets the content of the user's speech while performing weighting of a plurality of received recorded data according to recording state information indicating a recording state of each of the plurality of received recorded data transmitted from the plurality of devices.

11. The apparatus according to claim 10, wherein:
the recording state information includes at least one of a recording level, a noise level, and an echo.

12. The apparatus according to claim 10, wherein:
the recording state information includes all information of a recording level, a noise level, and an echo.

13. The apparatus of claim 12, wherein the recording state describes a reliability of the plurality of devices, the reliability comprising a sum of values representing the recording level, the noise level, and the echo.

14. The apparatus of claim 9, wherein:
the type of output unit used in the device refers to whether a headset or speaker is being used, with priority given to the headset over the speaker;
the distance between the device and the user is classified into distance ranges, where shorter distance ranges are given priority over longer distance ranges; and
the performance of the output unit of the device refers to giving priority to a device with an output unit that is loudest or largest.

15. A program product comprising a non-transitory computer-readable storage medium that stores code executable by a processor, the executable code comprising code to perform:
a voice recognition process of voice-recognizing recorded data of a same user's speech received through a communication module and transmitted from each of a plurality of devices in accordance with a predetermined standard to thereby interpret a content of the user's speech; and
a voice assistant process of:
performing voice assistant according to the contents of the user's speech interpreted in the voice recognition process; and
selecting a device for outputting the voice assistant among the plurality of devices according to a predetermined priority, the predetermined priority determined based on analyzing different factors for each of the plurality of devices, the factors comprising a state where the device is in use or not in use, a type of an output unit used in the device, a distance between the device and a user, and performance of the output unit of the device, the server apparatus analyzing the different factors in the foregoing order.

16. The program product of claim 15, wherein the executable code further comprises code to perform interpreting content of the user's speech while performing weighting of a plurality of received recorded data according to a recording state information indicating a recording state of each of the plurality of received recorded data transmitted from the plurality of devices.

17. The program product of claim 16, wherein:
the recording state information includes at least one of a recording level, a noise level, and an echo.

18. The program product of claim 16, wherein:
the recording state information includes all information of a recording level, a noise level, and an echo.

19. The program product of claim 18, wherein the recording state describes a reliability of the plurality of devices, the reliability comprising a sum of values representing the recording level, the noise level, and the echo.

20. The program product of claim 15, wherein:
the type of output unit used in the device refers to whether a headset or speaker is being used, with priority given to the headset over the speaker;
the distance between the device and the user is classified into distance ranges, where shorter distance ranges are given priority over longer distance ranges; and the performance of the output unit of the device refers to giving priority to a device with an output unit that is loudest or largest.

\* \* \* \* \*